(12) United States Patent
She et al.

(10) Patent No.: US 7,848,439 B2
(45) Date of Patent: Dec. 7, 2010

(54) COMMUNICATION APPARATUS, COMMUNICATION SYSTEM, AND COMMUNICATION METHOD

(75) Inventors: Xiaoming She, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 11/719,611

(22) PCT Filed: Nov. 18, 2005

(86) PCT No.: PCT/JP2005/021246
§ 371 (c)(1),
(2), (4) Date: May 17, 2007

(87) PCT Pub. No.: WO2006/054697
PCT Pub. Date: May 26, 2006

(65) Prior Publication Data
US 2009/0147866 A1   Jun. 11, 2009

(30) Foreign Application Priority Data
Nov. 19, 2004   (CN)  .................. 2004 1 0094967

(51) Int. Cl.
*H04K 1/10* (2006.01)
(52) U.S. Cl. ............... 375/260; 375/267; 375/299; 375/324; 375/349
(58) Field of Classification Search ........... 375/260, 375/267, 299, 324, 349
See application file for complete search history.

(56) References Cited

U.S. PATENT DOCUMENTS

| | | | |
|---|---|---|---|
| 6,351,499 B1 * | 2/2002 | Paulraj et al. ............... 375/267 |
| 6,836,484 B2 | 12/2004 | Suzuki | |
| 7,505,529 B2 * | 3/2009 | Kwak et al. ............ 375/295 |
| 2003/0231706 A1 | 12/2003 | Hwang | |
| 2006/0008020 A1 * | 1/2006 | Blankenship et al. ....... 375/261 |

FOREIGN PATENT DOCUMENTS

| | | |
|---|---|---|
| CN | 1466297 | 1/2004 |
| CN | 1469662 | 1/2004 |
| CN | 1496623 | 5/2004 |
| JP | 01238269 | 8/2001 |

(Continued)

OTHER PUBLICATIONS

PCT International Search Report dated Feb. 14, 2006.

(Continued)

*Primary Examiner*—Shuwang Liu
*Assistant Examiner*—Kabir A Timory
(74) *Attorney, Agent, or Firm*—Dickinson Wright PLLC

(57) ABSTRACT

A communication apparatus capable of improving the spectrum usage rate of a system, especially, the spectrum usage rate in connection with both a fast fading and a channel estimation error as compared with the conventional sub-band adaptive method, while reducing the degree of the difficulty in achieving the adaptation, and further reducing the feedback overhead. In this apparatus, a sub-band group AMC parameter selecting part (318) selects an AMC parameter of each sub-band. An adaptive reception control part (503) must control an adaptive demodulating/decoding part (311), while controlling a parallel/serial converter (312) in a stage preceding the adaptive demodulation and decoding processes, and combining received symbols in the same sub-band group for demodulation and decoding.

11 Claims, 16 Drawing Sheets

FOREIGN PATENT DOCUMENTS

| | | |
|---|---|---|
| JP | 03169036 | 6/2003 |
| JP | 2004104293 | 4/2004 |
| WO | 2004040813 | 3/2004 |
| WO | 2004040827 | 3/2004 |

OTHER PUBLICATIONS

Sharath B. Reddy, et al., "An Efficient Blind Modulation Detection Algorithm for Adaptive OFDM Systems," Vehicular Technology Conference, 2003, VTC 2003-Fall, 2003 IEEE 58th, Aug. 9, 2003, pp. 1895-1899.

Yuanrun Teng, et al.; "Grouping Adaptive Modulation Method for Burst Mode OFDM Transmission System," Technical Report of IEICE, Aug. 31, 2003, vol. 101, No. 280, pp. 51-57.

* cited by examiner

COMMUNICATION APPARATUS, COMMUNICATION SYSTEM, AND COMMUNICATION METHOD

TECHNICAL FIELD

The present invention relates to a communication apparatus, communication system, and communication method, and particularly relates to a communication apparatus, communication system and communication method carrying out adaptive modulation and coding in adaptive transmission technology in subcarrier communication systems—that is, in wireless communication orthogonal frequency division multiplexing (OFDM) system.

BACKGROUND ART

OFDM technology is mainstream technology for implementing high-speed wireless data transmission. OFDM technology theory is transmitting high-speed data using a large number of subcarriers that are orthogonal, and data rates of the subcarriers are relatively low. Compared to a typical frequency division multiplexing system, orthogonality of a subcarrier in OFDM improves spectral efficiency of the system. In OFDM, the whole signal bandwidth is divided into a plurality of narrow subcarrier frequency bandwidths, and flat fading occurs when the subcarrier bandwidths are smaller than the channel bandwidth. In this way, compared to the monocarrier system, flat fading in OFDM can be implemented in a more straightforward manner. Currently, OFDM technology is successfully applied to asynchronous digital subscriber lines (ADSL), digital television broadcasts (DVB) and wireless ATM (WATM) systems.

In order to improve a spectrum utilization rate in wireless systems, adaptive and high spectrum utilization rate-transmission technology has been requested for high-speed wireless data transmission for fading channels. In fading channels, compared to fixed coding modulation, adaptive modulation/coding technology is capable of effectively improving a throughput and an error rate (BER) of a system. Here, the throughput referred to is the spectrum utilization rate of the system—that is, the amount of information transmitted within a unit spectrum bandwidth and a unit time. The basic concept of AMC technology is adaptively changing one or more types of transmission power, symbol transmission rate, coordinate size, coding rate and coding mechanism based on channel characteristics at the current point and, when channel conditions are good, transmitting a large amount of information to increase spectrum utilization rate, and, when channel conditions are poor, transmitting a small amount of information to ensure a certain receiving BER request.

Before introducing an AMC method in OFDM, first, channel characteristics in OFDM transmission will be introduced briefly.

FIG. 1 shows an example of OFDM channel characteristics.

Here, two horizontal axes respectively indicate OFDM symbols on the time domain and subcarrier numbers on the frequency domain, and the vertical axis indicates channel gains corresponding to OFDM symbols and subcarriers. OFDM channels fluctuates in both time domain and frequency domain as a result of time domain spreading and time domain spreading of channels in transmission.

As described above, the concept of AMC is to change modulation and coding parameters in transmission based on channel characteristics at this current time. With OFDM, adaptivity in this case refers to adaptivity at two domains of time domain and frequency domain. Currently, as an adaptive configuration, AMC in OFDM is divided into two, AMC based on subcarriers and AMC based on subbands. The AMC based on subcarriers referred to here refers to carrying out transmission using a modulation method and a coding method that are different per OFDM subcarrier taking each subcarrier as a minimum unit of adaptivity. However, AMC based on subcarriers is very difficult to be implemented, and, in addition, has the problem that feedback overhead is too large. Typically, it is difficult to implement an AMC method based on subcarriers in an actual system. As another adaptive configuration in OFDM, a subband configuration using independent coding, namely, a subband adaptive method of the related art is, relatively, typically used.

FIG. 2 shows subband adaptive modulation and coding of the related art.

In this configuration, all of the subcarriers on the OFDM frequency domain are divided into several subbands. Here, a subband indicates a subcarrier group comprised of subcarriers in neighboring positions on the frequency domain. For example, in FIG. 2, the total number of subbands is N. One modulation coding block is then formed by the same subbands at several (in the case of FIG. 2, M) neighboring OFDM symbols. In subband adaptivity of the related art of FIG. 2, the modulation coding blocks carry out estimation of coding modulation parameters based on the channel characteristics and carry out independent coding. The numbers within the coding modulation blocks of FIG. 2 denote the classification coding modulation parameters of encoded modulation blocks belong to.

Typically, coding modulation parameters corresponding to classifications for the coding modulation parameters are decided in initial stages of a system. For example, the relationships between a classification, coding parameter, and modulation parameter are shown in Table 1 as an example. The present invention is by no means limited to Table 1.

TABLE 1

| Classification | Coding parameter | Modulation parameter |
| --- | --- | --- |
| 0 | Not transmitted | Not transmitted |
| 1 | ½Turbo | BPSK |
| 2 | ½Turbo | QPSK |
| 3 | ¾Turbo | QPSK |
| 4 | ⅔Turbo | 8PSK |
| 5 | ¾Turbo | 16QAM |
| 6 | ⅔Turbo | 64QAM |

Next, a block view implementing a subband adaptive method of the related art is shown in OFDM in FIG. 3.

FIG. 3A and FIG. 3B are block views showing an OFDM-AMC system combining OFDM and AMC of the related art.

When communication between a communication apparatus of FIG. 3A (transmission side) and communication apparatus of FIG. 3B (receiving side) is assumed to be carried out, typical examples are given by a base station (AP) of FIG. 3A and a mobile terminal (UE) of FIG. 3B. Further, assume that an AMC mechanism is used in transmission from FIG. 3A to FIG. 3B.

On the transmission side of FIG. 3A, information bits to be transmitted first pass through adaptive modulation/coding section 301. The output serial modulation symbols then pass through serial/parallel converter (S/P) 302 and inverse fast Fourier transformer (IFFT) 303 so that symbols in the frequency band are converted to the time domain. The symbols then pass through parallel/serial converter (P/S) 304 and have guard intervals inserted by guard interval insertion section 305. The bits are then transmitted via antenna 306. On the receiving side in FIG. 3B, after receiving transmission signals transmitted from the transmission side via receiving antenna 316, guard interval removing section 315 removes the guard intervals inserted on the transmission side. Further, the signal then passes through serial/parallel converter (S/P) 314 and fast Fourier transformer (FFT) 313 to be converted from time domain to frequency domain symbols. The signals are then subjected to parallel/serial conversion processing by parallel/serial converter (P/S) 312 and are finally outputted by adaptive demodulating/decoding section 311 to obtain received data.

Adaptive transmission from the transmission side of FIG. 3A to the receiving side of FIG. 3B is implemented mainly by adaptive modulation/coding section 301 on the transmission side and adaptive demodulating/decoding section 311 on the receiving side. As described above, the meaning of adaptive modulation and coding is to adaptively adjust modulation and coding parameters on the transmission side based on channel characteristics at the current time and to carry out demodulation and decoding using parameters corresponding to the transmission side on the receiving side. In a typical system, adaptive parameters required by adaptive demodulating/decoding section 311 depend on feedback from the receiving side. Before transmitting each data block, the receiving side always first estimates transmission channel from the transmission side to the receiving side at the current time by channel estimating section 319, and obtains channel characteristics of the subcarriers of the OFDM. Based on these channel characteristics, the receiving side then decides modulation and coding parameters used for the OFDM subbands in the case of transmitting data from the transmission side at the current point by parameter selecting section 318. Parameters for adaptive modulation and coding at the subbands obtained by parameter selecting section 318 have two uses.

The first use is the use as a parameter for modulation and coding at each OFDM subband when the transmission side transmits data at the current time. After selecting modulation and coding parameters of the OFDM subbands, subband AMC parameter selecting section 318 on the receiving side then transmits these parameters back to the transmission side via a feedback path of receiving side parameter transmitting section 320, antenna 316 on the receiving side, antenna 306 on the transmission side, and parameter receiving/extracting section 307 on the transmission side. After extracting these parameters, the transmission side controls adaptive modulation/coding section 301 using AMC control section 308.

The second use is the use as a parameter when the receiving side carries out demodulation and decoding. In AMC transmission, the receiving side is able to obtain accurate information bits for the first time by carrying out demodulation and decoding of received data based on modulation and coding parameters that are always the same as in the transmitting side. Subband AMC parameter selecting section 318 obtains and then transmits AMC parameters to adaptive demodulating/decoding section 317, and adaptive demodulating/decoding section 317 temporarily saves the AMC parameter. The AMC parameter needs to be used in control of adaptive demodulating/decoding section 311 on the receiving side.

In FIG. 4A and FIG. 4B, module 309 of FIG. 3A and module 321 of FIG. 3B are segmented to describe a method for employing subband AMC in OFDM of the related art in a clearer manner.

FIG. 4A and FIG. 4B show configurations for implementing subband adaptive modulation/coding of the related art.

On the transmission side of FIG. 3A, adaptive modulating/coding section 301 is comprised of adaptive coding section 401, interleave section 402, and adaptive modulation section 403. Data outputted from adaptive modulating/coding section 301 is transmitted to inverse fast Fourier transformer (IFFT) 303 via serial/parallel converter (S/P) 302. Transmission side AMC control section 308 controls adaptive modulating/coding section 301 based on modulation and coding parameters for the subbands obtained from parameter receiving/extracting section 307 of FIG. 3A. In subband adaptivity of the related art, coding modulation is carried out independently for the OFDM subbands. Namely, all subbands have respective independent modulation and coding parameters. AMC control section 308 controls adaptive modulating/coding section 301 using the obtained coding parameters C and modulation parameters M for the subbands. Further, AMC control section 308 obtains the number of information bits transmitted at the subbands based on the coding parameters C and modulation parameters M, generates a corresponding interleave matrix IT as a result, and controls interleave section 402 of adaptive modulating/coding section 301. On the transmission side, after AMC, a serial data stream 404 is obtained. This contains data transmitted in the order of subband 1, 2, . . . N, with modulation and coding methods of $(C_1, M_1)$, $(C_2, M_2), \ldots, (C_N, M_N)$, respectively. After this, this data is subjected to serial/parallel conversion and is then sequentially mapped to subbands corresponding to OFDM and is transmitted.

All of the AMC parameters necessary in transmission of the data blocks on the transmission side are fed back from the receiving side. Namely, before the transmission side transmits the data blocks, the receiving side first needs to select AMC parameters for use in the data blocks that the transmission side transmits In the procedure where the receiving side selects parameters first, channel estimation is carried out using the received signal. A method based on a pilot or blind channel estimation etc. may be given as a method of channel estimation. After this, channel estimation section 319 transmits channel characteristics of the obtained OFDM subcarriers to subband AMC parameter selecting section 318. Subband AMC parameter selecting section 318 first carries out analysis of the performance of the subbands in OFDM in this way, and selects AMC parameters appropriate for the respective subbands from the selected set of AMC parameters. AMC parameters obtained in this way are then transmitted back to the transmission side via a feedback channel, and are used in actual adaptive modulation and coding operations when the transmission side carries out transmission, and also used at adaptive demodulating/decoding control section 409 on the receiving side. At the same time, taking time delay into consideration, parameter storing section 410 is necessary for storing parameters obtained at the current time. Adaptive demodulating/decoding section 311 on the receiving side is comprised of adaptive decoding section 408, deinterleaving section 407 and adaptive decoding section 406.

Compared to subcarrier adaptivity, the adaptive method using independent coding of subbands of the related art shown in FIG. 3A to FIG. 4B is able to effectively reduce the difficulty of implementation of adaptivity and is able to effectively reduce feedback overhead of the system. However, even in this kind of method, there is the drawback that it is not possible to effectively utilize diversity performance between the subbands.

Diversity is an important method for improving wireless transmission quality. The diversity referred to here is generally described as technology where the transmitting side increases redundancy of information using a certain resource and modifies or attenuates redundant information on both of the receiving side and the transmission side independently as much as possible, and, the receiving side utilizes and synthesizes the information in a collective manner, thereby obtaining a certain system gain. To summarize, this is technology where transmission is carried out simultaneously by utilizing a plurality of paths, and deficiencies in certain paths on the receiving side is compensated for by other paths.

In addition to the foundation of an independent coding method using subbands in OFDM adaptive modulation and coding of the related art, the present application is to obtain a patent for a method for combining subbands using a certain method, assuming the subbands as a subband group, then carrying out joint coding for subband groups. With AMC methods of the related art, a parameter is selected and coding is carried out for each subband independently, and, the method of the present application therefore seems to run counter to the concept of AMC of the related art in appearance. However, this method adopts diversity between subbands and is therefore able to obtain a larger coding gain. Further, if selection of modulation coding parameters is carried out within subband groups using the method proposed here, loss in transmission throughput is not generated compared with the method of the related art. By combining both, the method for which the present application seek a patent promotes improvement of adaptive transmission performance in OFDM.

DISCLOSURE OF THE INVENTION

Problems to be Solved by the Invention

The object of the present invention is therefore to provide communication apparatus, a communication system and a communication method capable of increasing spectrum utilization rate of a system and particularly increasing spectrum utilization rate based on high-speed fading and channel estimation error, reducing the degree of difficulty of adaptivity, and reducing the feedback overhead compared with subband adaptive methods of the related art by combining all of the subbands on a frequency domain of a subcarrier communication system based on a fixed rule to as to give several subband groups, and then selecting modulation and coding parameters for use during joint coding with respect to each subband group.

Means for Solving the Problem

A communication apparatus of the present invention adopts a configuration having: a channel estimating section that carries out channel estimation per subband; a parameter deciding section that decides modulation parameters and coding parameters per subband group comprised of a plurality of subbands based on the channel estimation result; a parameter information transmission section that transmits to a communicating party, parameter information that is information for the modulation parameters and the coding parameters decided at the parameter deciding section; a receiving section that receives a received signal containing data modulated and encoded per subband group at a communicating party using the modulation parameters and coding parameters of the parameter information transmitted at the parameter information transmission section; and a data obtaining section that demodulates and decodes the received signal received at the receiving section per subband group using the modulation parameters and coding parameters decided at the parameter deciding section and obtains the data contained in the received signal.

A communication system of the present invention is a communication system having a base station apparatus transmitting modulated and encoded data and a communication terminal apparatus receiving the data, and adopting a configuration having :the communication terminal apparatus comprising: a channel estimating section that carries out channel estimation per subband; a parameter deciding section that decides modulation parameters and coding parameters per subband group comprised of a plurality of subbands based on channel estimation results; a parameter information transmission section that transmits parameter information that is information for the modulation parameters and the coding parameters decided at the parameter deciding section; a receiving section that receives a received signal containing data modulated and encoded per subband group at the base station apparatus using parameters of parameter information transmitted at the parameter information transmission section; and a data extracting section that modulates and decodes a received signal received at the receiving section per subband group using the modulation parameters and the coding parameters of the parameter information and extracts the data contained in the received signal, and, in this system, the base station apparatus comprises an adaptive modulating/coding section that modulates and encodes data in accordance with the modulation parameters and coding parameters of the parameter information transmitted by the transmission section; and a data transmission section that transmits data modulated and encoded at the adaptive modulating/coding section.

A communication method of the present invention having the steps of: carrying out channel estimation per subband; deciding modulation parameters and coding parameters per subband group comprised of a plurality of subbands based on the channel estimation results; at a communication terminal apparatus, transmitting parameter information that is information for the decided modulation parameters and coding parameters; at a base station apparatus, receiving the parameter information transmitted by the communication terminal apparatus; modulating and coding data in accordance with the modulation parameters and the coding parameters of the received parameter information; at the base station apparatus, transmitting the modulated and encoded data; at the communication terminal apparatus, receiving a received signal containing the data transmitted by the base station apparatus; and modulating and decoding the received signal per subband group using the modulation parameters and the coding parameters of the parameter information, and extracting data contained in the received signal.

BEST MODE FOR CARRYING OUT THE INVENTION

Embodiment

An embodiment of the present invention will be described in detail below using the drawings. To accurately describe the present invention, an example of an OFDM system will be described here. The adaptive modulation method and coding method of the present invention can be applied to every other subcarrier communication systems carrying out communication using subcarriers.

The present invention is to provide subband groups by combining subbands using a certain scheme and perform joint coding, on the basis that independent coding and modulation of subbands is used in OFDM adaptive modulation/coding of the related art. Further, the invention proposes various methods for putting subbands into subband groups, and proposes methods for selecting modulation and coding parameters used in joint coding within subbands. These will be described later.

Figure 5A:
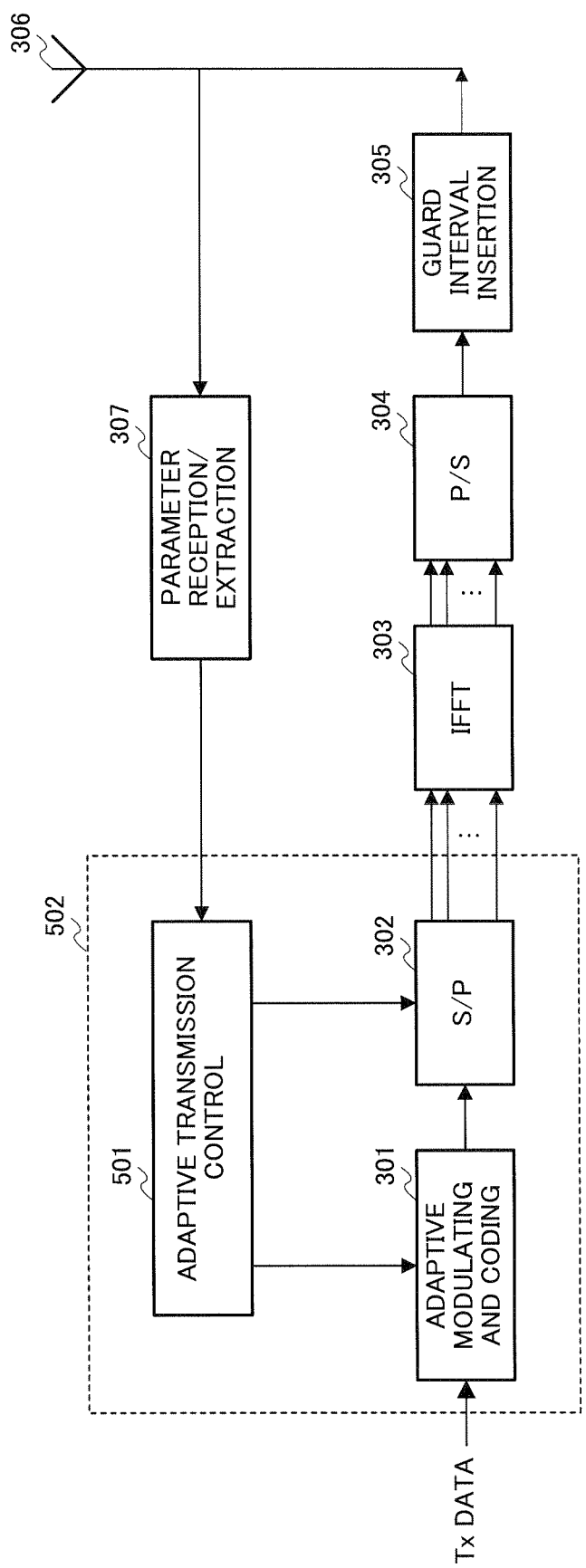
FIG. 5A is a block view showing a configuration for the transmission side of an OFDM-AMC system of an embodiment of the present invention.
Figure 5B:
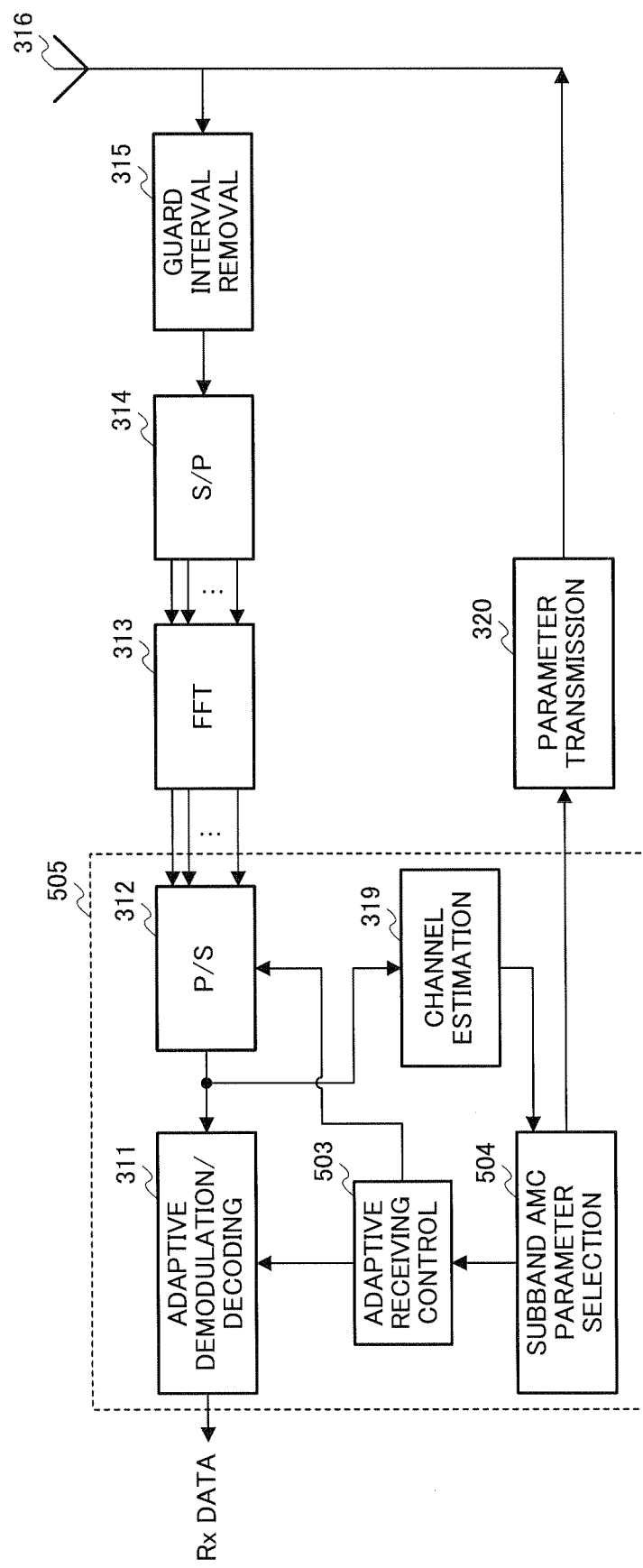
FIG. 5B is a block view showing a configuration for the receiving side of an OFDM-AMC system of an embodiment of the present invention.

FIG. 5A and FIG. 5B show OFDM-AMC system configurations implementing the method of the present invention.

To more accurately describe the present invention, known configurations in the related art as shown in FIG. 1 to FIG. 4B are assigned the same codes and their description will be omitted, and only a configuration for which the present invention and the related art are different from each other will be described.

Compared to the OFDM-AMC system configuration of the related art shown in FIG. 3A and FIG. 3B, the system to which OFDM-AMC of the present invention is applied has differences below.

Figure 3A:
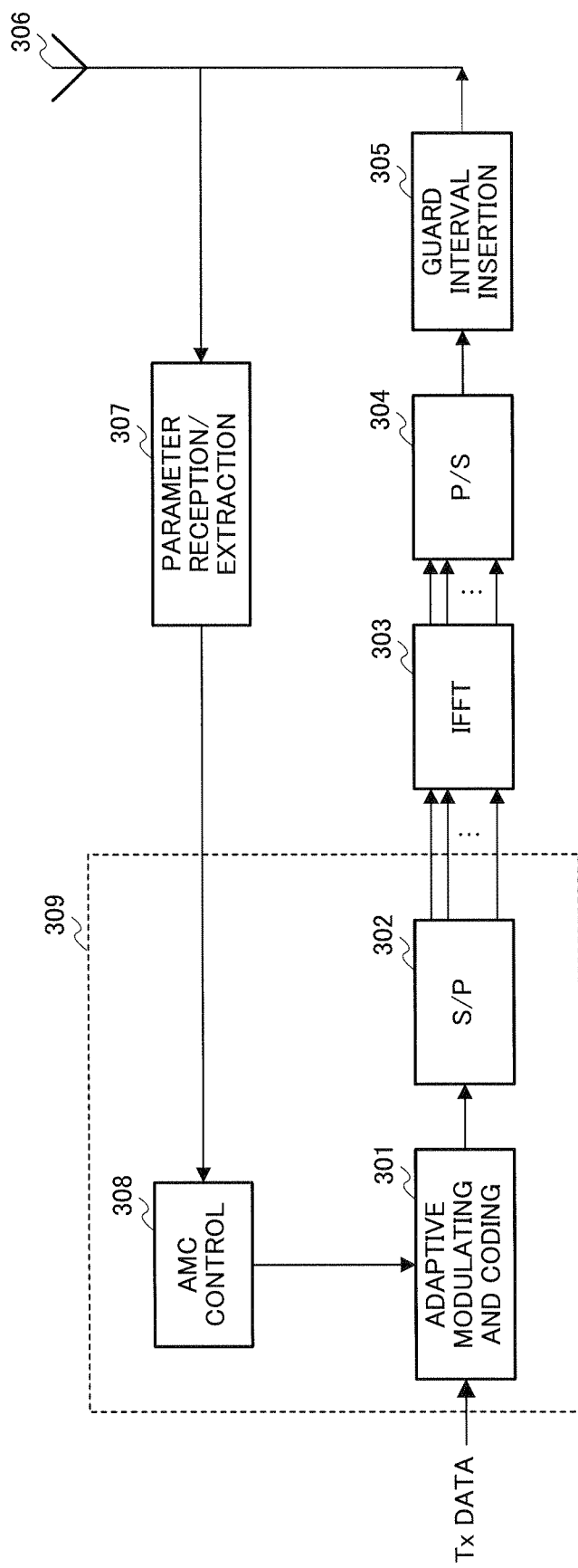
FIG. 3A is a block view showing a configuration for the transmission side of an OFDM-AMC system of the related art.
Figure 3B:
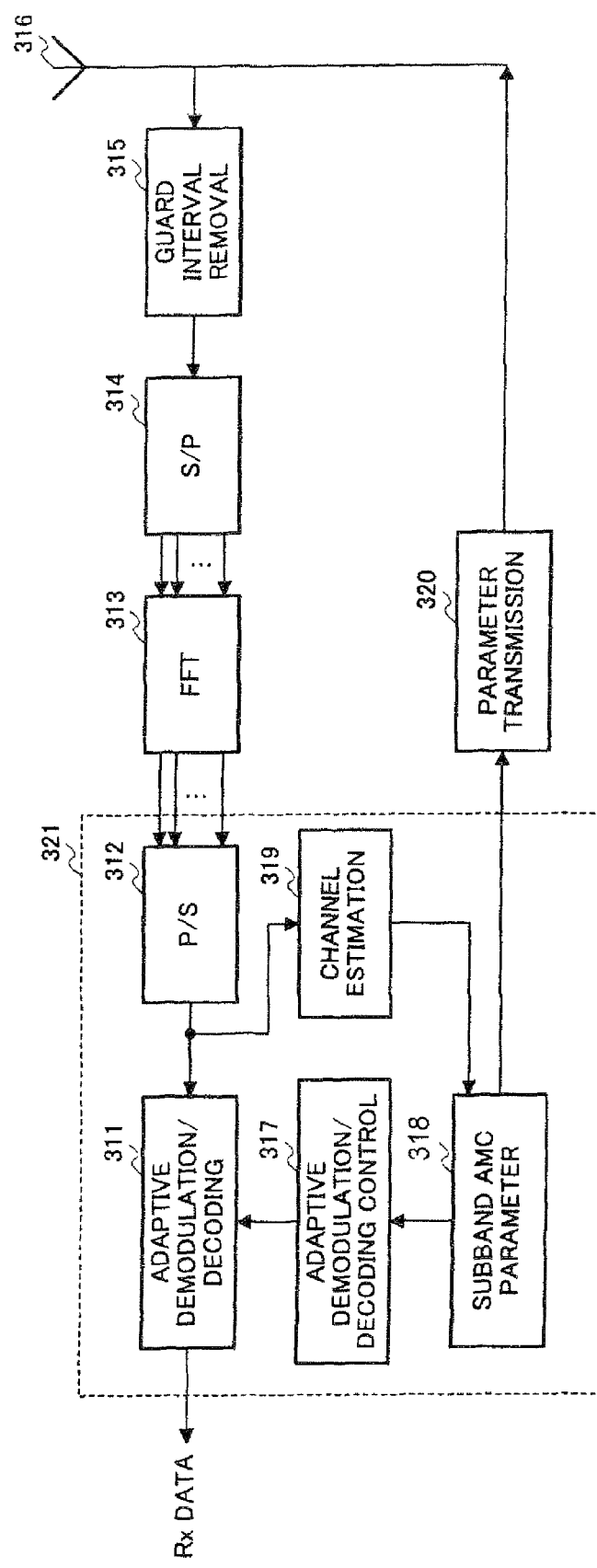
FIG. 3B is a block view showing a configuration for the receiving side of an OFDM-AMC system of the related art.

Subband group AMC parameter selection section 504 that is a parameter deciding section contained in module 505 shown in FIG. 5B selects AMC parameters for the subband group, and subband AMC parameter selection section 316 contained in module 321 of FIG. 3B selects AMC parameters for the subbands. This is because in the OFDM-SMC system of the present invention, the adaptive modulation and coding units are subband groups whereas in the OFDM-AMC system of the related art the units of the subband adaptive modulation and coding are subbands. With The present invention, all of the subbands in the frequency domain in OFDM are made into several subband groups using combination patterns, and adaptive modulation and coding then are performed on the subband groups. Further, with the OFDM-AMC system of the present invention, AMC parameters relating to subband groups as parameter information that is information for modulation parameters and coding parameters, are transmitted in a feedback route of a series in the order of parameter transmitting section 320, receiving side antenna 316, transmission side antenna 306 and transmission side parameter receiving/extracting section 307, rather than the AMC parameters relating to subbands as in the OFDM-AMC system of the related art shown in FIG. 3.

Further, on the transmission side, AMC control section 308 shown in FIG. 3A replaces with adaptive transmission control section 501. In the technology of the present invention, the transmission side carries out adaptive modulation and coding on subband groups in OFDM, and the subband groups are formed by combining the OFDM subbands based on combination patterns. Adaptive transmission control section 501 has to control AMC for subband groups within adaptive modulation/coding section 301, and also has to control serial/parallel converter (S/P) 302 after adaptive modulation and coding so as to perform mapping information bits transmitted for the subband groups to corresponding subbands within OFDM after coding and modulation and transmission.

Further, on the receiving side, adaptive modulating/control section 317 as shown in FIG. 3B is replaced with receiving control section 503. Adaptive receiving control section 503 has to control adaptive demodulating/decoding section 311 that is the data obtaining section, also controls parallel/serial converter (P/S) 312 that is prior to adaptive demodulation and decoding, synthesizes received symbols within the same subband group, and carries out demodulation and decoding.

Figure 6A:
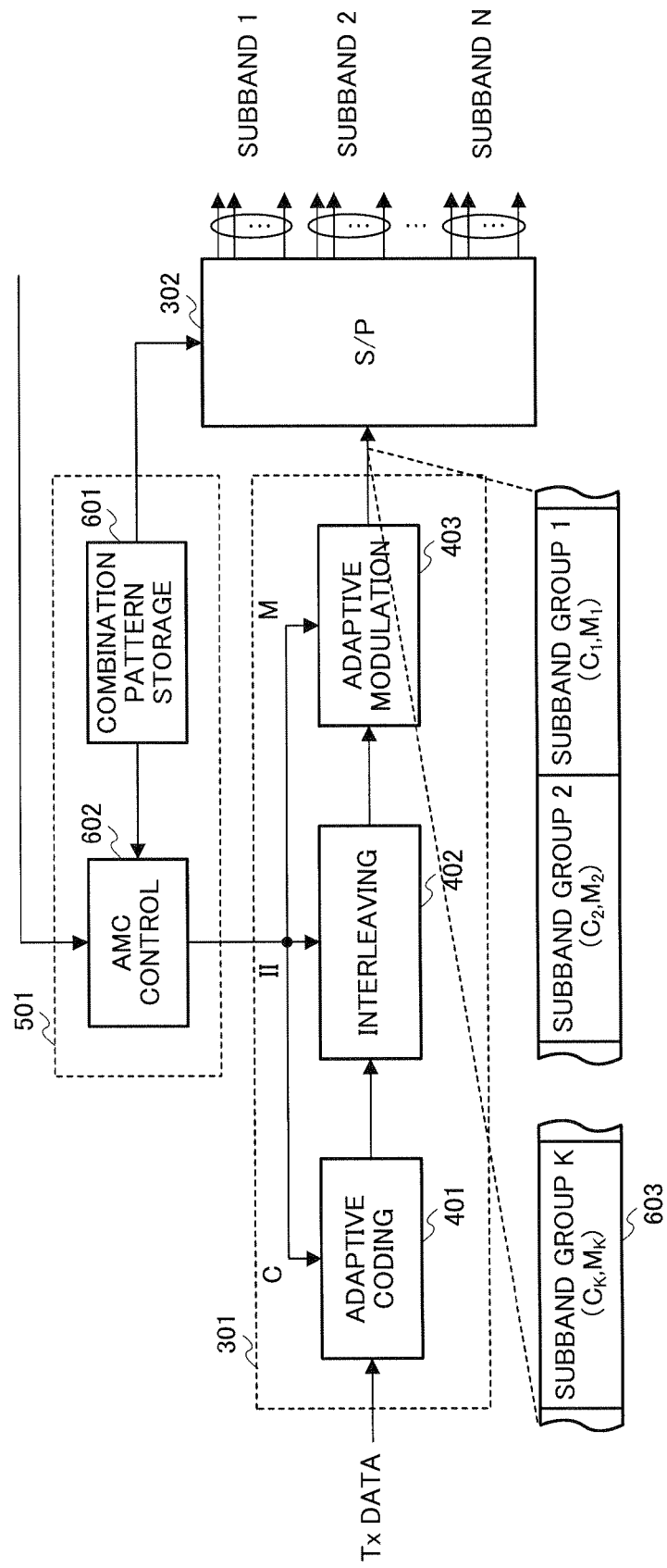
FIG. 6A shows a module containing an adaptive modulating/coding section on a transmission side of an embodiment of the present invention.
Figure 6B:
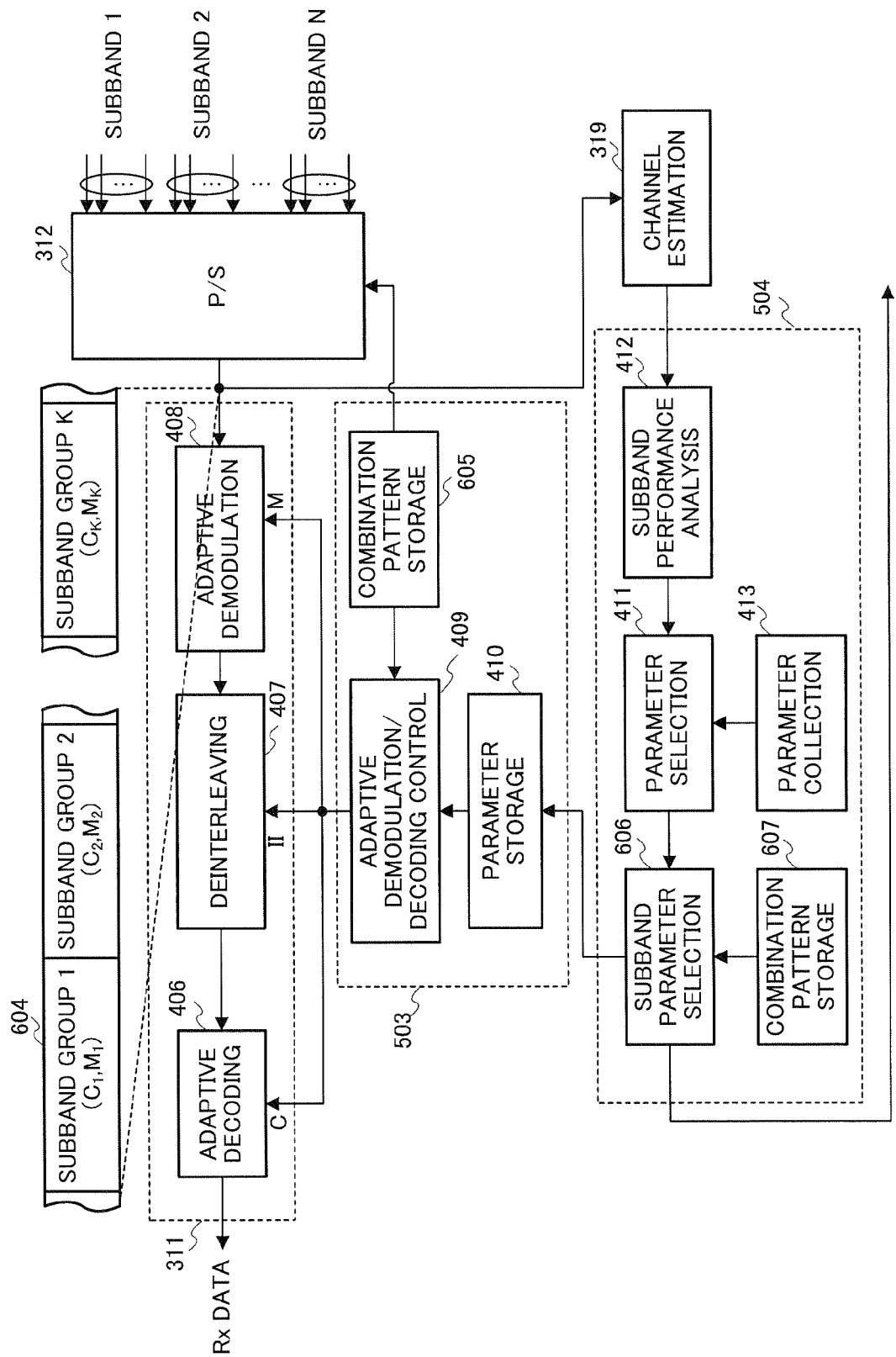
FIG. 6B shows a module containing an adaptive demodulating/decoding section on a receiving side of an embodiment of the present invention.

Module 502 of FIG. 5A and module 505 of FIG. 5B are segmented and shown in FIG. 6A and FIG. 6B.

FIG. 6A and FIG. 6B show configurations for implementing a method proposed by the present invention.

Figure 4A:
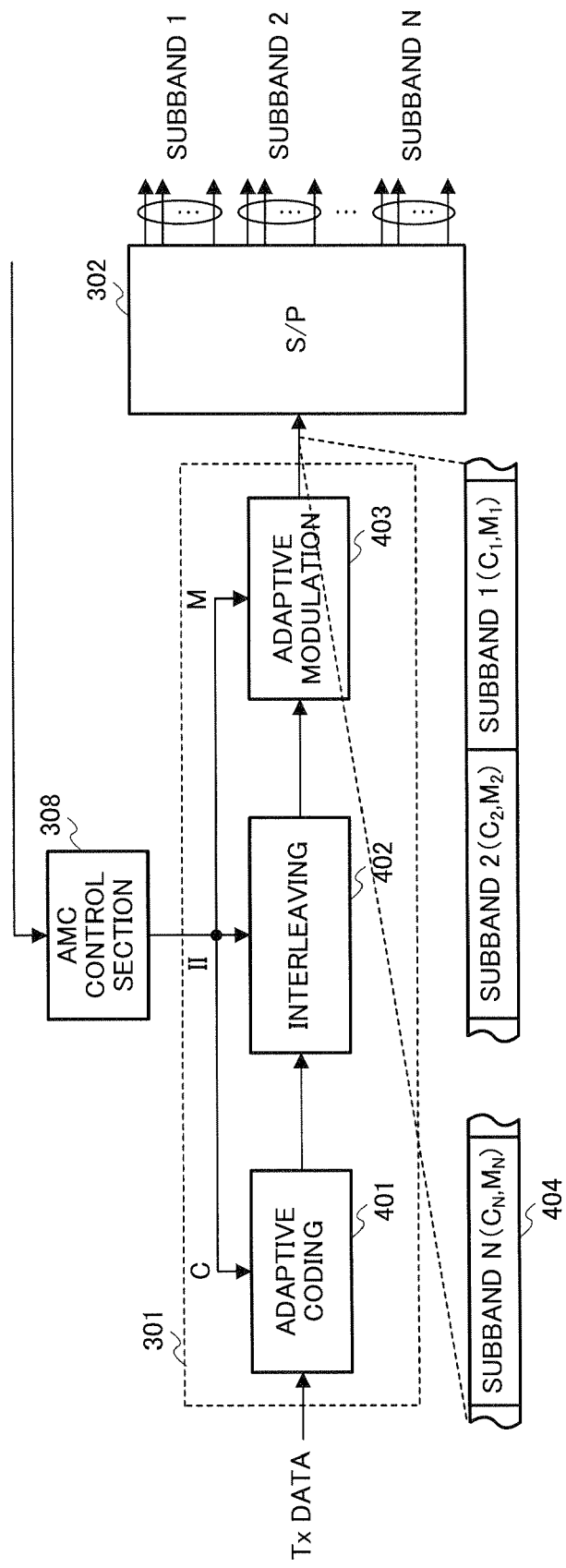
FIG. 4A shows a module containing an adaptive modulating/coding section on a transmission side of the related art.

On the transmission side, a point of distinction with subband adaptivity of the related art shown in FIG. 4A is that the units for adaptive modulation and coding are subband groups rather than subbands. In this event, output 603 of adaptive modulating/coding section 301 contains transmission data in the order of subband groups $1, 2, \ldots K$, where the modulation methods and coding methods are $(C_1, M_1), (C_2, M_2), \ldots, (C_K, M_K)$, where K is the total number of subband groups divided within OFDM. Further, the transmission side has to control the AMC operation, and, in addition, control serial/parallel conversion at serial/parallel (S/P) section 302 based on subband combination patterns stored in combination pattern storage section 601. By this means, the transmission side maps and transmits information bits transmitted using the subband groups to corresponding subbands within OFDM after coding and modulation.

Figure 4B:
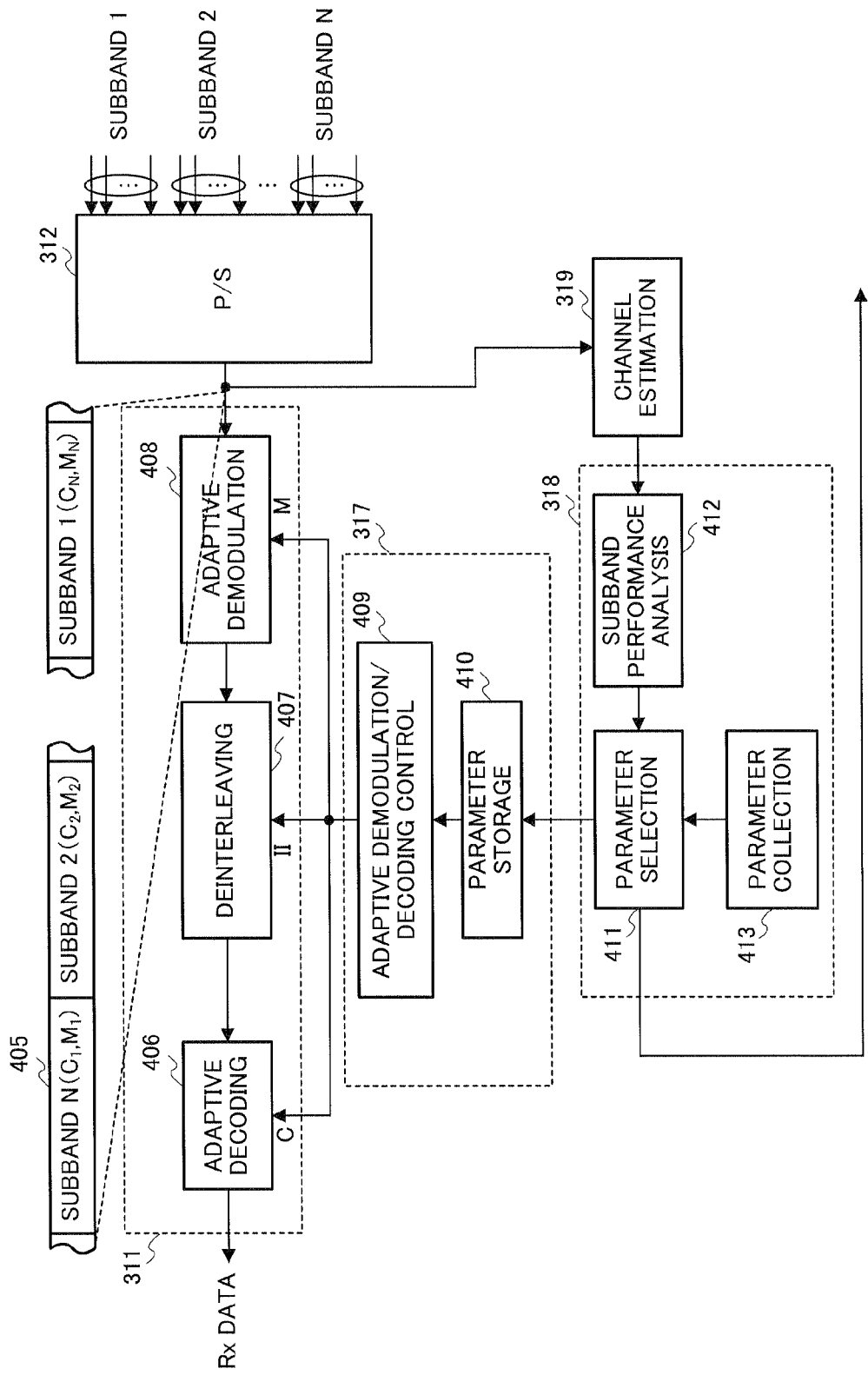
FIG. 4B shows a module containing an adaptive demodulating/decoding section on a receiving side of the related art.

On the receiving side, differences with subband adaptivity of the related art shown in FIG. 4B is that the unit of adaptive demodulation and coding is a subband group rather than a subband. Further, the receiving side has to control adaptive demodulation and decoding, and, in addition, control parallel/serial conversion at parallel/serial converter (P/S) section 312 based on subband combination patterns stored in combination pattern storage section 605. By this means, the receiving side synthesizes receiving symbols within the same subband groups of the OFDM and carries out demodulation and decoding. Moreover, as shown in FIG. 6B, subband group AMC parameter selection section 504 is also different from FIG. 4B. In FIG. 6B, parameter selecting section 411 selects and obtains parameters for the OFDM subbands, and parameter selecting section 606 of the subband group then has to select adaptive parameters for the OFDM subband groups based on combination patterns stored in combination pattern storage section 607.

Figure 7:
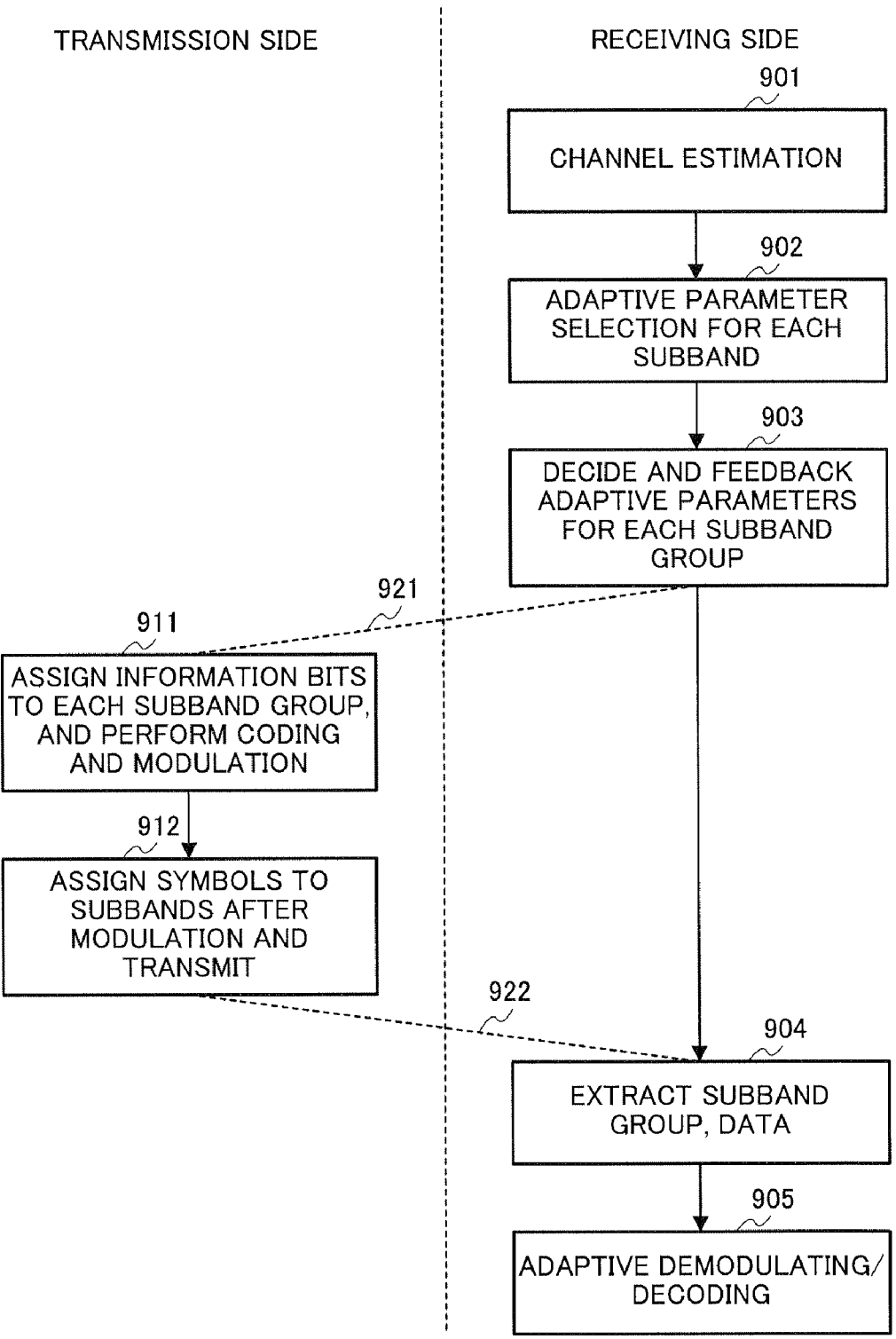
FIG. 7 shows an adaptive modulation and coding method of an embodiment of the present invention.

FIG. 7 is a flowchart showing processing for implementing an adaptive coding method and modulation method of an embodiment of the present invention. Specifically, the processing for implementing the technology of the present invention is as described below.

As the first stage, the receiving side decides adaptive modulation and coding parameters within the subband groups in the transmission side OFDM, and feeds the decided parameters back to the transmission side. This process includes estimating channels (step 901), selecting adaptive parameters for the OFDM subbands (step 902), selecting adaptive parameter for the OFDM subband groups (step 903), and feeding parameter back (step 921) on the receiving side.

A typical existing method including, for example, channel estimation based on a pilot and blind channel estimation may be used for the channel estimation in step 901.

In the case of independent coding for the subbands in the related art, adaptive parameter selection for the OFDM subbands in step 902 indicates modulation and coding parameters used in carrying out adaptive transmissions at the OFDM subbands. This is independent coding, parameters within the subbands differ according to differences in channel characteristics.

In this operation, it is necessary to decide sets of adaptive parameters constituting selection candidates, like in the sets of parameters shown in Table 1 and Table 2. After this, appropriate modulation and coding parameters are selected based on the channel characteristics at the subbands at the current time, and, at the same time, the number of corresponding transmission information bits is decided. Here, various methods may be used as existing methods for selecting parameters based on channel characteristics, including, for example, a method based on a minimum signal to noise ratio of subbands, a method based on an average signal to noise ratio of subbands, a method based on capacity, or a method based on combinations of an average signal to noise ratio and other statistical characteristics. With this embodiment, an example of a method based on an average signal to noise ratio will be briefly described.

The method based on an average signal to noise ratio decides signal to noise ratio threshold values (refer to Table 2) necessary for parameters for various types of modulation and coding using a method referred to as logical analysis or simulation. The throughput performance in this case, that is, spectrum utilization rate corresponding to parameters for various types of modulation and coding is, in terms of a numeric value, equal to the product of the coding rate and the number of bits contained in the symbols. After this, an average signal to noise ratio is calculated for subcarriers inside the subbands. Finally, a modulation and coding parameter having a threshold value lower than the average signal to noise ratio and a maximum throughput performance are then selected as modulation and coding parameters at the subbands. Table 2 shows the relationship of the coding parameters, modulation parameters, signal to noise ratio threshold values and throughput performance at the classifications. For example, when average signal to noise ratios within a subband are 0, 2, 4, 6, and 8, according to the parameters shown in Table 2, the classifications corresponding to the selected modulation and coding parameters are 1, 1, 2, 3, and 4, respectively. The number of information bits assigned within the subband is decided in a manner corresponding to this (in terms of a numeric value, this is equal to the product of the total number of subcarriers within the subband and the throughput performance corresponding to selected coding and modulation parameters).

TABLE 2

| Classification | Coding parameter | Modulation parameter | SNR threshold value (dB) | Throughput performance (bps/Hz) |
|---|---|---|---|---|
| 0 | Not transmitted | Not transmitted | −∞ | 0 |
| 1 | ½Turbo | BPSK | −0.4 | 0.5 |
| 2 | ½Turbo | QPSK | 2.2 | 1 |
| 3 | ¾Turbo | QPSK | 5.2 | 1.5 |
| 4 | ⅔Turbo | 8PSK | 7.6 | 2 |
| 5 | ¾Turbo | 16QAM | 10.9 | 3 |
| 6 | ⅔Turbo | 64QAM | 14.5 | 4 |

Figure 8:
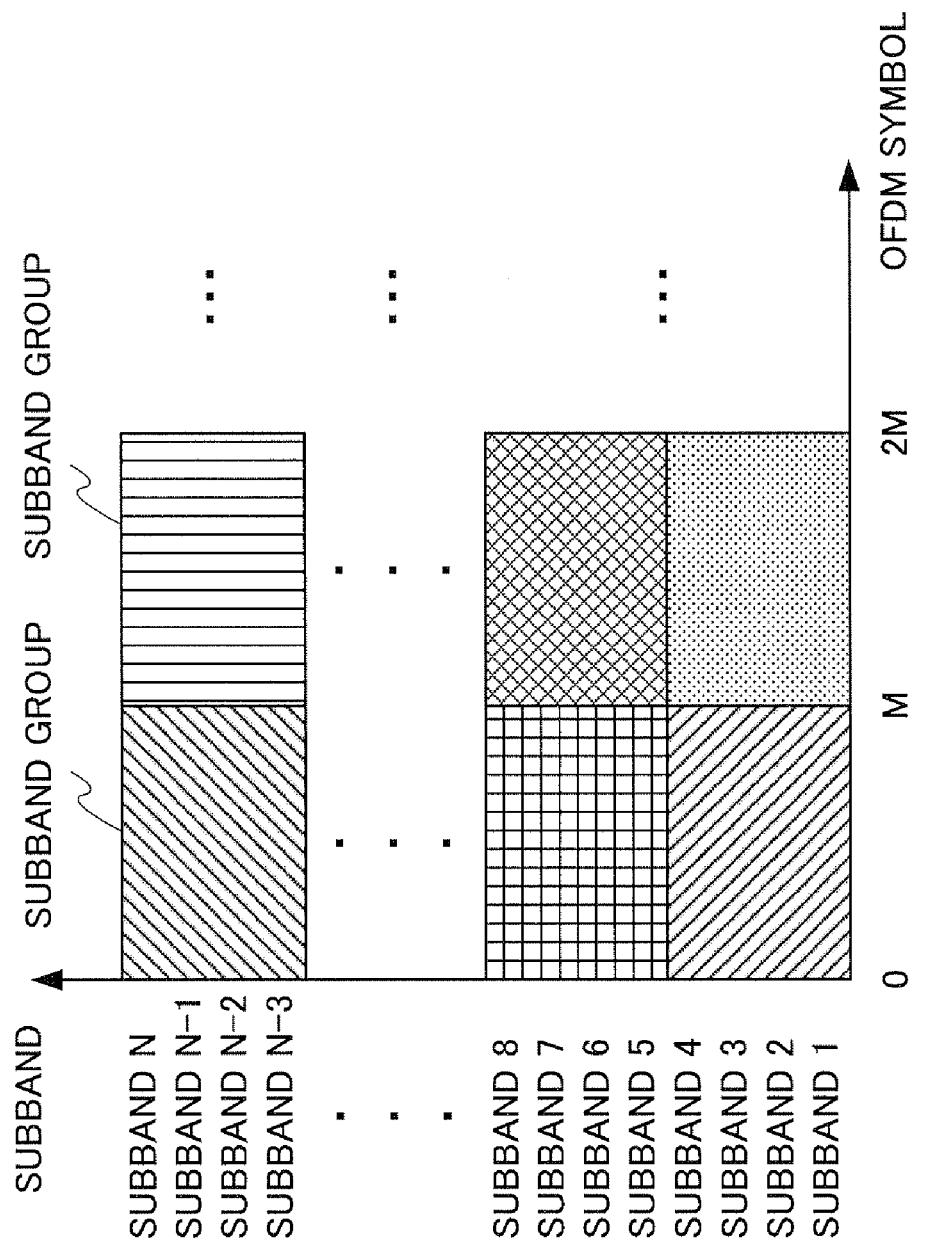
FIG. 8 shows an example of a subband group of an embodiment of the present invention.

Although modulation and coding are carried out independently per OFDM subband in adaptive methods of the related art, with the method of the present application, selection of adaptive parameters for the OFDM subband groups in step 903 is achieved by providing subband groups as the units of adaptive transmission rather than subbands. All of the subbands in an OFDM frequency domain are first taken to be several subband groups based on a certain combination method (or combination pattern) A method of combining neighboring subbands, a method of combining subbands spaced at intervals, a method of combining all of the subbands, or a method of combining in accordance with another rule may be given as methods of combining. The method of combining neighboring subbands, that is, the method of selecting a plurality of subbands neighboring on the frequency axis, is a method taking several subbands at neighboring positions to be one subband group, as shown in FIG. 8. FIG. 8 shows an example of combining neighboring subbands. Further, the subband group has a subband combination patterns, and a subband is formed from the same number of subcarriers at positions neighboring with respect to frequency within a specific number of subcarrier modulation symbols.

In FIG. 8, N subbands on a frequency domain that have the same positions an the OFDM time domain are taken to be several subband groups. Here, subbands at positions neighboring with respect to frequency are taken to be one subband group. Namely, subbands at patterns with the same shading in the drawings belong to the same subband group.

Figure 9:
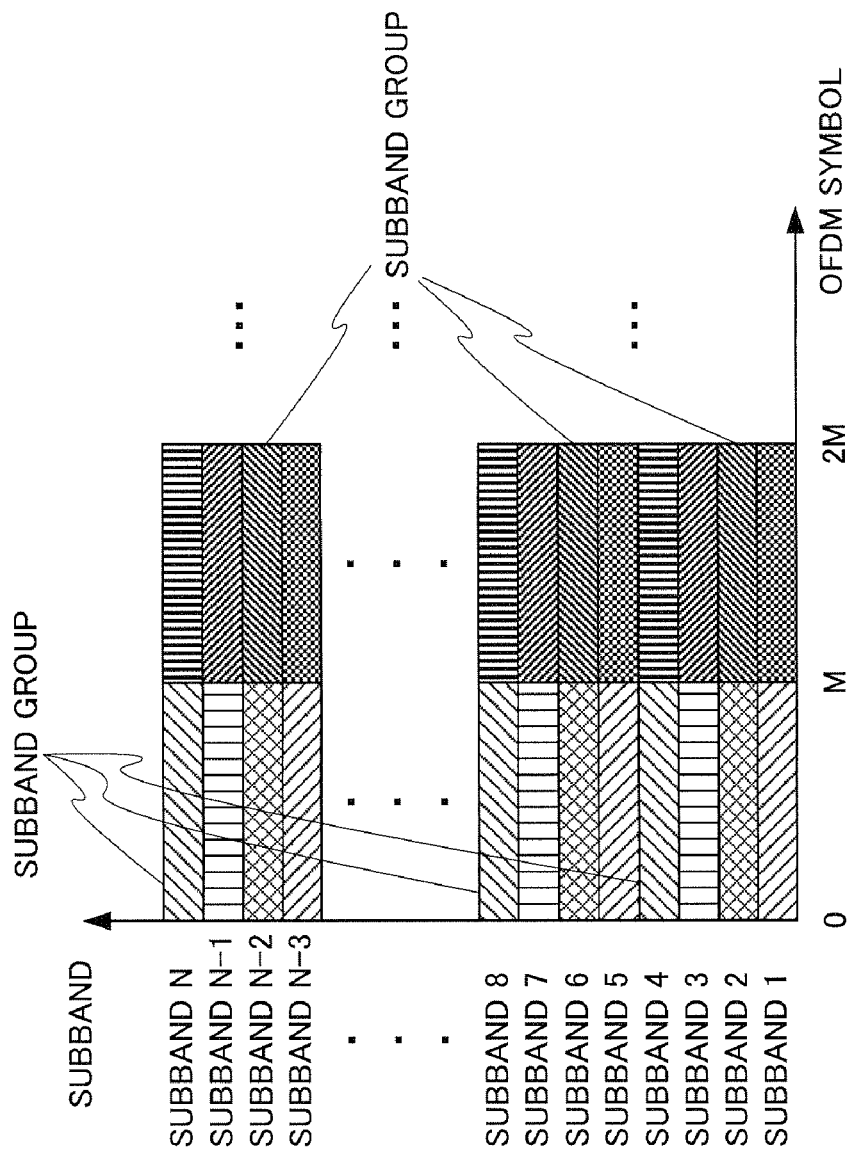
FIG. 9 shows another example of a subband group of an embodiment of the present invention.

Further, the method of combining subbands spaced at intervals, that is, the method of selecting a plurality of subbands at predetermined intervals from subbands arranged on the frequency axis is a method of selecting several subbands spaced at intervals and take these subbands to be one subband group as shown in FIG. 9. FIG. 9 shows an example of combining subbands spaced at intervals.

In FIG. 9, subbands spaced at intervals on the OFDM frequency domain are selected, synthesized, and taken to be one subband group. Namely, subbands at patterns with the same shading in the drawings belong to the same subband group.

Figure 10:
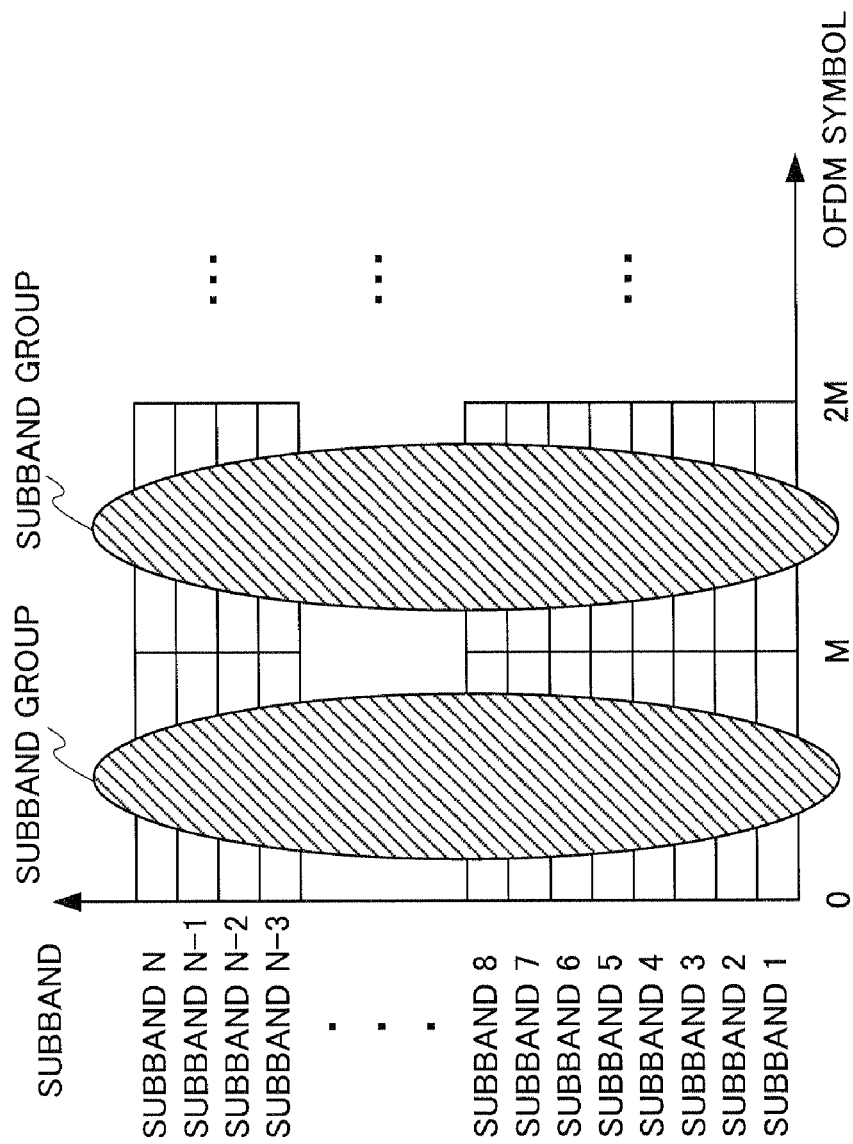
FIG. 10 shows yet another example of a subband group of an embodiment of the present invention.

Further, the method of combining all of the subbands, namely, the method of selecting all of the subbands every predetermined time domain, as shown in FIG. 10, is a method of synthesizing all of the subbands in the frequency domain into a single subband group. FIG. 10 is an example of combining all of the subbands.

In FIG. 10, all N subbands on the frequency domain that have the same positions on the OFDM time domain are synthesized and are taken to be one subband group.

Further, with a method of combining using another rule, after the modulation and coding parameters of the subbands at the subband groups and the number of bits of assigned bits information are decided, the number of information bits and joint coding parameters assigned within a subband group are decided as follows. First, a modulation method where the sum of the number of information bits assigned within the subbands is obtained and the obtained number is taken to be the number of information bits assigned to the entire subband group. Next, the maximum modulation classifications within the subbands are made uniform in the subband groups and the result is used as a modulation scheme in modulation. Next, the coding rate is obtained from the number of information bits assigned within the subband group and the modulation method.

In this process, it is assumed that, for example, there are four subbands A, B, C and D at one subband group, the number of subcarriers included at the subbands is 512, and that the classifications of coding and modulation corresponding to the subbands are 0, 1, 2, and 3 respectively. As a result, the number of information bits assigned within the subband groups of A, B, C and D are 512×0=0 for A, 512×0.5=256 for B, 512×1=512 for C, and 512×1.5=768 for D. Because of this, the total number of information bits within the subband group is 0+256+512+768=1536. The highest modulation classification is then selected for the subband groups of A, B, C and D (here, the modulation classification corresponding to subband D is the highest), and 8PSK is taken to be a modulation parameter uniform over the whole of the subband group. Correspondingly, the coding rate used in coding in a uniform manner for the subband group is 1536/(512×3×4)=1;4.

The sum of the number of bits of transmission information at the four subbands of A, B, C and D obtained through estimation is then obtained and taken to be the number of information bits to be transmitted within the subband group. In this actual operation, weighting calculations may also be carried out on this numeric value. For example, considering the case where channel fluctuation is relatively early, the sum of the number of transmission information bits at the four subbands of A, B, C and D is obtained, and weighting is then carried out using 0.9, thereby taking (0+256+512+768)×0.9≈1382 to be the total number of information bits within the subband.

The feedback of parameters in step 921 is transmitted back to the transmission side via a feedback channel after adaptive parameters for the OFDM subbands group are obtained on the receiving side, and an actual operation is carried out on the transmission side based on this parameters.

In a second stage, the transmission side assigns the number of information bits for transmission use corresponding to each subband group based on adaptive parameters within the OFDM subband group fed back from the receiving side, and carries out joint coding and modulation within the subband groups per corresponding parameter(step 911). For example, joint modulation and coding is carried out on the subband groups comprised of the four subbands of A, B, C and D based on the above assumptions, and, in this case, the modulation and coding parameters are 8PSK and ¼ Turbo code. The modulated symbols are then assigned to corresponding OFDM subbands based on subband combination patterns and the result is transmitted (step 912). Specifically, this includes serial/parallel conversion at serial/parallel converter 302, inverse fast Fourier transform at inverse fast Fourier transform section 303, parallel/serial conversion at parallel/serial converter 304, and guard interval insertion at guard interval insertion section 305.

In the third stage, the receiving side first removes guard intervals at guard interval removing section 315, carries out parallel/serial conversion at serial/parallel converter 314, carries out fast Fourier conversion at fast Fourier converting section 313, and carries out parallel/serial conversion at parallel/serial converter 312. The receiving side extracts data within the received OFDM subband groups based on the subband combination patterns by controlling parallel/serial converter 312 (step 904), and, after this, carries out adaptive demodulation and decoding on the subband groups using the adaptive parameters within the subband groups obtained in the first stage, and obtains original data to be transmitted finally(step 905).

The present invention effectively improves spectrum utilization efficiency of a system and in particular spectrum utilization efficiency under high-speed fading and channel estimation error, and reduces the degree of difficulty in implementing adaptivity and feedback overhead by carrying out combination and joint coding on the OFDM subbands and effectively utilizing diversity performance between subbands.

Figure 11:
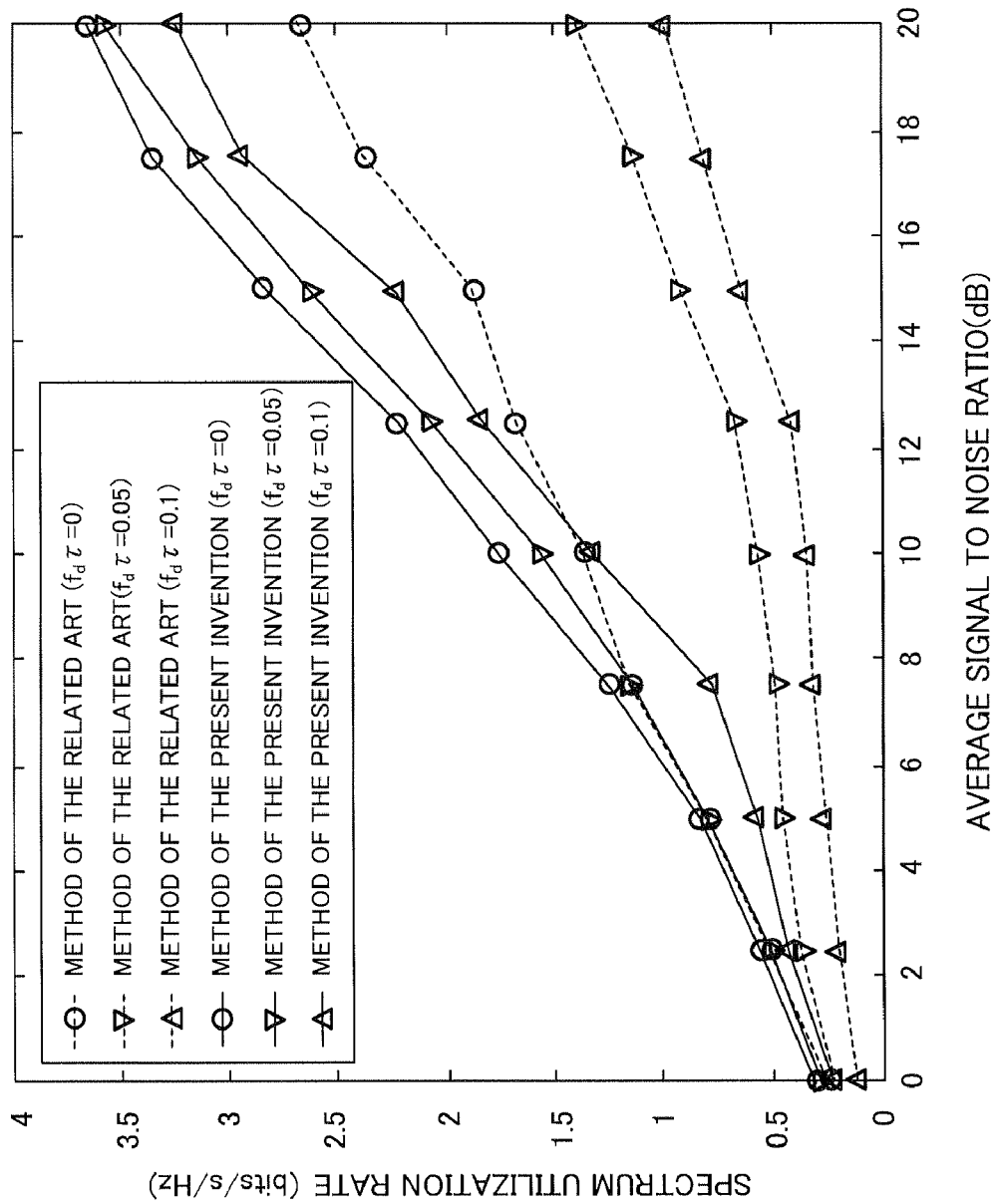
FIG. 11 shows the comparison results of performance of adaptive modulation and coding of an embodiment of the present invention and adaptive modulation and coding of the related art.

FIG. 11 shows the comparison results of the performance of the method of the present invention and the method of the related art under different feedback delay times.

Figure 12:
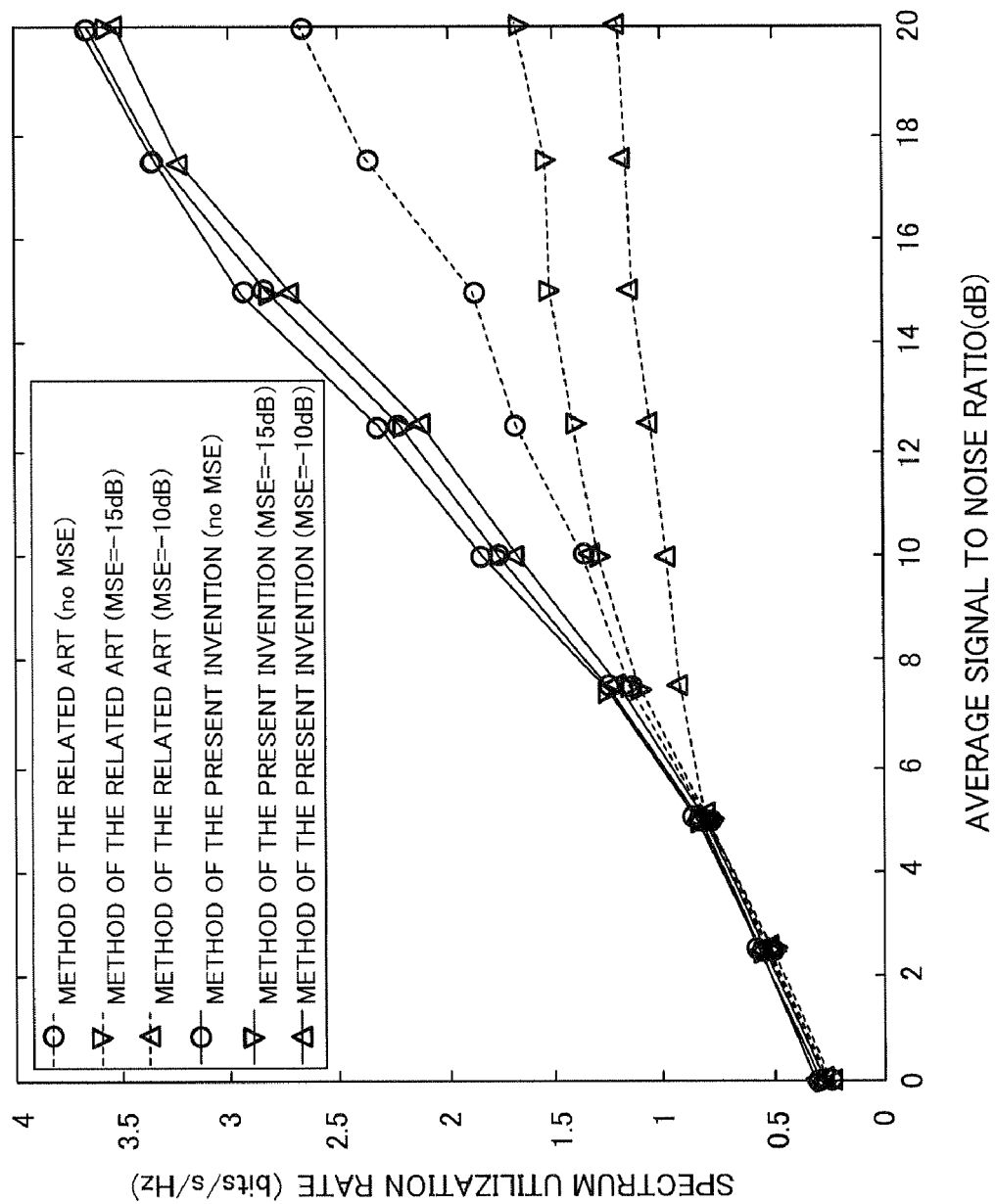
FIG. 12 shows other comparison results of performance of adaptive modulation and coding of an embodiment of the present invention and adaptive modulation and coding of the related art.

FIG. 12 shows the comparison results of the performance of the method of the present invention and the method of the related art under different channel estimation errors.

Figure 1:
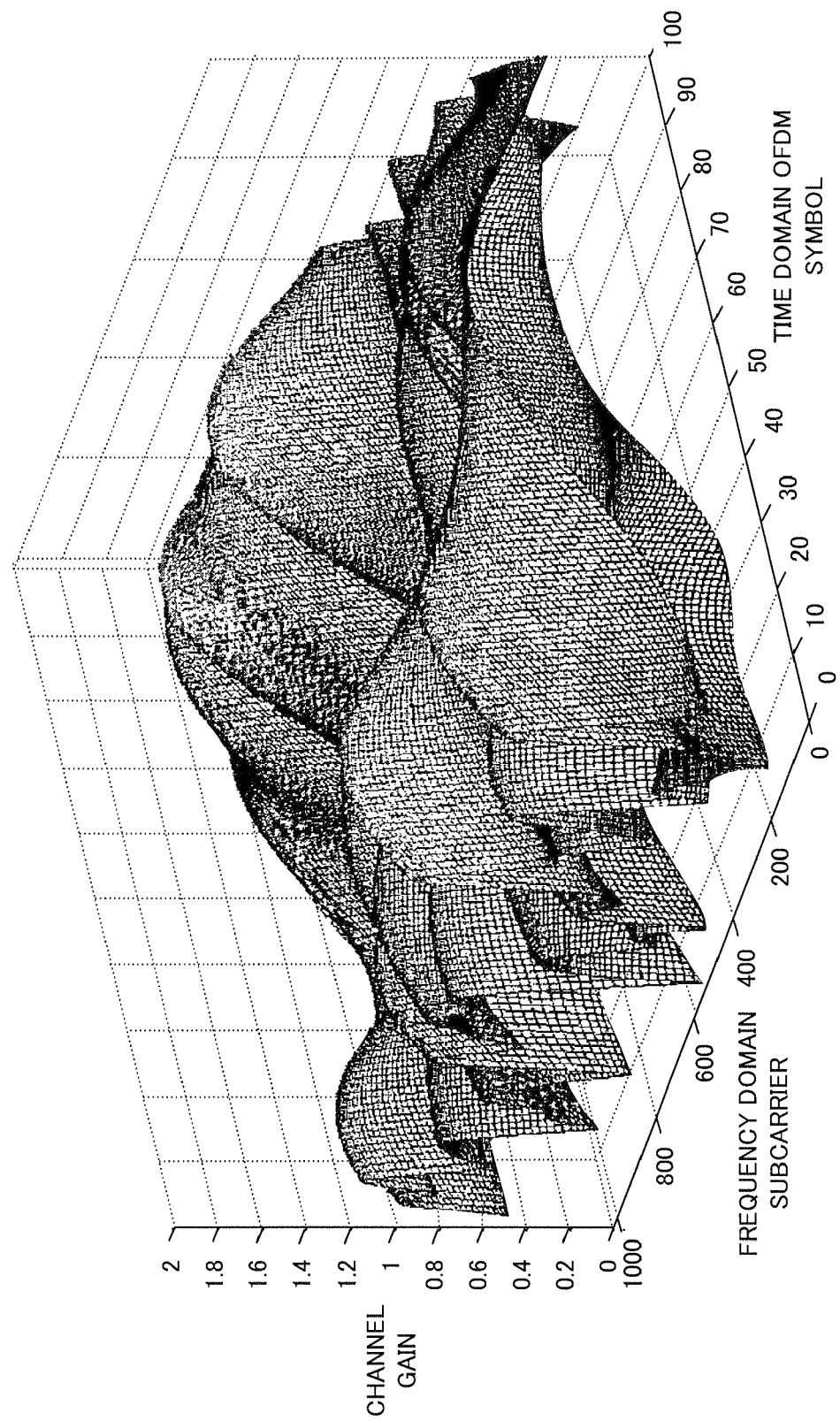
FIG. 1 shows an example of OFDM channel characteristics.
Figure 2:
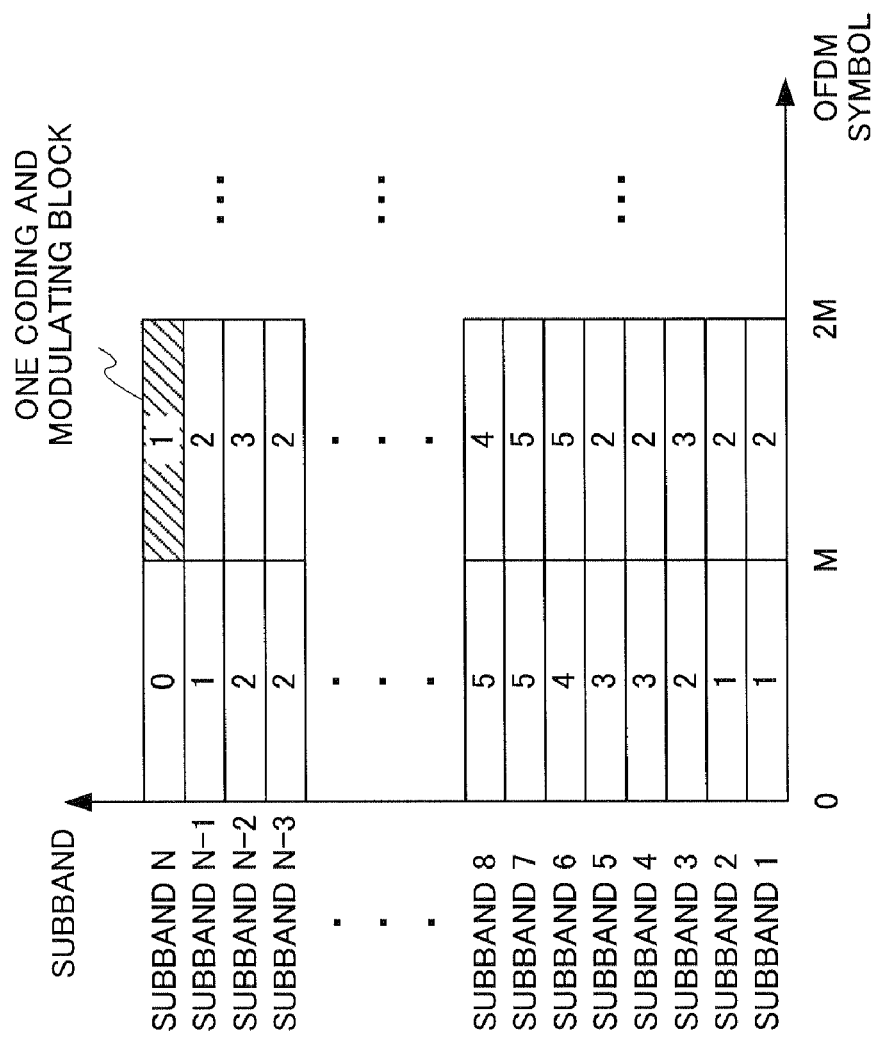
FIG. 2 shows adaptive modulation and coding of the related art.

Here, as a simulation, it is assumed that signal bandwidth of the OFDM system is 10 MHz, the total number of subcarriers is 1024, and subbands divided into 16 are provided, and each subband is over eight OFDM symbols on the time domain. Assume that a recursive system convolution (RSC) polynomial for the quantity of the Turbo code adopts (13, 11)$_{OCT}$, fourth order recursion decoding, and a maximum after probability (MAP) algorithm. ARQ is adopted in the system. Assume that the channel model used in the simulation is an M.1225 mounted channel model A. For specific implementation, one subband uses an average signal to noise ratio parameter estimating method using a method of combining the entire subband. Here, $f_d\tau$ and MSE in FIG. 11 and FIG. 12 denote the product of maximum Doppler frequency deviation and feedback time delays, and a channel estimation error, respectively. The method of the related art is as shown in FIG. 2. As is understood from the results of FIG. 11 and FIG. 12, the methods proposed by the present invention have a certain performance gain when compared to methods of the related art, regardless of whether this is an ideal case ($f_d\tau$=0, no MSE), or whether there is high-speed fading ($f_d\tau$ exists) or whether a channel estimation error exists (MSE exists). Further, in this case, if all 16 sixteen subbands are synthesized into a single subband group, the feedback over head becomes 1/16 of the original.

As described above, the present invention has been described in line with preferred embodiments. However, it is obvious for those skilled in the art that the present invention may be implemented with various modifications, replacements, and additions within the spirit and the scope of the present invention. The present invention is therefore by no means limited to the embodiments described above.

The invention claimed is:
1. A communication apparatus comprising:
a channel estimating section that carries out a channel estimation per subband;

a parameter deciding section that decides modulation parameters and coding parameters per subband group comprised of a plurality of the subbands, based on a result of the channel estimation per subband;

a parameter information transmission section that transmits, to a communicating party, parameter information indicating the modulation parameters and the coding parameters decided at the parameter deciding section;

a receiving section that receives a signal containing data modulated and encoded on a per subband group basis at the communicating party using the modulation parameters and the coding parameters of the parameter information transmitted at the parameter information transmission section;

a data obtaining section that demodulates and decodes the received signal received at the receiving section on a per subband group basis using the modulation parameters and the coding parameters decided at the parameter deciding section, and obtains the data contained in the received signal; and a pattern storage section that stores in advance patterns for selecting subbands constituting the subband groups wherein the parameter deciding section decides the modulation parameters and the coding parameters per subband group comprised of the subbands selected based on the patterns stored in the pattern storage section.

2. The communication apparatus of claim 1, wherein the parameter deciding section decides the modulation parameters and the coding parameters per subband group constituted from a pattern, among the patterns, for selecting a plurality of the subbands neighboring on a frequency axis.

3. The communication apparatus of claim 1, wherein the parameter deciding section decides the modulation parameters and the coding parameters per subband group constituted from a pattern, among the patterns, for selecting a plurality of the subbands at predetermined intervals from subbands arranged on a frequency axis.

4. The communication apparatus of claim 1, wherein the parameter deciding section decides the modulation parameters and the coding parameters per subband group constituted from a pattern, among the patterns, for selecting all of the subbands per predetermined time domain.

5. The communication apparatus of claim 1, wherein the parameter deciding section finds the modulation parameters per subband within the subband group, and decides modulation parameters with a highest classification within the found modulation parameters as the modulation parameters for the subband group.

6. The communication apparatus of claim 1, wherein the parameter deciding section decides the coding parameters in such a manner that a number of information bits that are able to be assigned to all of the subbands within the subband group is assigned to the subband group.

7. A base station apparatus that is the communicating party of the communication apparatus of claim 1, the base station apparatus comprising an adaptive modulation and coding section that modulates and encodes the data in accordance with the modulation parameters and the coding parameters of the parameter information transmitted by the transmission section, and a data transmission section that transmits the data modulated and encoded at the adaptive modulation and coding.

8. A communication apparatus comprising:

a channel estimating section that carries out a channel estimation per subband;

a parameter deciding section that decides modulation parameters and coding parameters per subband group comprised of a plurality of the subbands based on a result of the channel estimation per subband;

a parameter information transmission section that transmits to a communicating party, parameter information indicating the modulation parameters and the coding parameters decided at the parameter deciding section;

a receiving section that receives a signal containing data modulated and encoded per subband group at the communicating party, using the modulation parameters and coding parameters of the parameter information transmitted at the parameter information transmission section; and a data obtaining section that demodulates and decodes the received signal received at the receiving section on a per subband group basis, using the modulation parameters and the coding parameters decided at the parameter deciding section, and obtains the data contained in the received signal;

wherein the parameter deciding section decides the coding parameters in such a manner that a number of information bits obtained by assigning a weight per subband group to a sum of information bits that are able to be assigned to all of the subbands within the subband group, is assigned to the subband group.

9. A communication system comprising a base station apparatus transmitting modulated and encoded data and a communication terminal apparatus receiving the data, wherein the communication terminal apparatus comprises:

a channel estimating section that carries out a channel estimation per subband;

a parameter deciding section that decides modulation parameters and coding parameters per subband group comprised of a plurality of the subbands based on a result of the channel estimation per subband;

a parameter information transmission section that transmits parameter information indicating the modulation parameters and the coding parameters decided at the parameter deciding section to the base station apparatus;

a receiving section that receives a signal containing the data modulated and encoded on a per subband group basis at the base station apparatus using parameters of the parameter information transmitted at the parameter information transmission section; and a data extracting section that demodulates and decodes the received signal received at the receiving section on a per subband group basis using the modulation parameters and the coding parameters of the parameter information, and extracts the data contained in the received signal; and a pattern storage section that stores in advance patterns for selecting subbands constituting the subband groups; and the base station apparatus comprises:

an adaptive modulation and coding section that modulates and encodes the data in accordance with the modulation parameters and the coding parameters of the parameter information transmitted by the transmission section; and a data transmission section that transmits the data modulated and encoded at the adaptive modulation and coding section; and the parameter deciding section decides the modulation parameters and the coding parameters per subband group comprised of the subbands selected based on the patterns stored in the pattern storage section.

10. A communication method comprising:
a channel estimating step of carrying out a channel estimation per subband;
a parameter deciding step of deciding modulation parameters and coding parameters per subband group comprised of a plurality of the subbands, based on a result of the channel estimation per subband;
a parameter information transmitting step of, at a communication terminal apparatus, transmitting parameter information indicating the decided modulation parameters and coding parameters;
an information receiving step of, at a base station apparatus, receiving the parameter information transmitted by the communication terminal apparatus;
a modulating and encoding step of modulating and coding data in accordance with the modulation parameters and the coding parameters of the received parameter information;
a data transmitting step of, at the base station apparatus, transmitting the modulated and encoded data;
a signal receiving step of, at the communication terminal apparatus, receiving a signal containing the data transmitted by the base station apparatus; and
a data extracting step of demodulating and decoding the received signal on a per subband group basis, using the modulation parameters and the coding parameters of the parameter information, and extracting data contained in the received signal,
wherein the parameter deciding step decides the modulation parameters and the coding parameters per subband group comprised of the subbands selected based on the patterns stored in a storage section for selecting the subbands constituting the subband group.

11. A communication system comprising a base station apparatus transmitting modulated and encoded data and a communication terminal apparatus receiving the data, wherein:

the communication terminal apparatus comprises:
a channel estimating section that carries out a channel estimation per subband;
a parameter deciding section that decides modulation parameters and coding parameters per subband group comprised of a plurality of the subbands, based on a result of the channel estimation per subband;
a parameter information transmission section that transmits parameter information indicating the modulation parameters and the coding parameters decided at the parameter deciding section, to the base station apparatus,
a receiving section that receives a signal containing data modulated and encoded on a per subband group basis at the base station apparatus using parameters of the parameter information transmitted at the parameter information transmission section; and
a data extracting section that demodulates and decodes the received signal received at the receiving section on a per subband group basis, using the modulation parameters and the coding parameters of the parameter information, and extracts the data contained in the received signal, and
the base station apparatus comprises:
an adaptive modulation and coding section that modulates and encodes the data in accordance with the modulation parameters and the coding parameters of the parameter information transmitted by the transmission section; and
a data transmission section that transmits the data modulated and encoded at the adaptive modulation and coding section; and
the parameter deciding section decides the coding parameters in such a manner that a number of information bits obtained by assigning a weight per subband group to a sum of information bits that are able to be assigned to all of the subbands within the subband group, is assigned to the subband group.

* * * * *